3,423,221
CATIONIC BITUMINOUS EMULSIONS FOR USE IN SLURRY SEAL TREATMENTS

Merton J. Borgfeldt, Oakland, Calif., assignor to Chevron Research Company, San Francisco, Calif., a corporation of Delaware
No Drawing. Filed Mar. 10, 1966, Ser. No. 533,232
U.S. Cl. 106—277                    4 Claims
Int. Cl. C08h 13/00

---

ABSTRACT OF THE DISCLOSURE

By emulsifying from 50–75% by weight of bitumen (asphalt) in water with from 0.2–2.0% by weight of a cation-active salt of the reaction product of tetraethylenepentamine and wood resin acids, such as "Vinsol Resin," rosin, or colophony, slow-setting bituminous emulsions are formed. These emulsions are easy to apply in slurry seal paving work with mineral aggregates, and the resulting coatings display excellent wear under traffic.

---

The present invention relates to mixing-grade, slow-setting cationic bituminous paving emulsions eminently suitable for the preparation of slurry seal mixtures. These emulsions are prepared by emulsifying bitumen, such as an asphalt, in water with a new kind of cation-active emulsifier which is a salt of the product of reaction of an aliphatic polyamine with a wood resin acid.

Conventionally, emulsion slurry seals are formulated from (1) mineral aggregate which is a fine stone aggregate and/or mineral filler and (2) about 15 to about 25% by weight thereof of a mixing-grade, slow-setting emulsion containing about 50 to about 75% by weight of bituminous residue (usually asphalt), with a further addition of about 10 to about 15% of water, based on the weight of the dry aggregate, to attain slurry consistency. Usually, difficult-to-coat, densely-graded aggregates, such as sand, pit-run, crusher-run, etc., are combined with bituminous emulsions to produce slurry seal compositions. These aggregates range in size from anything passing all through a sieve of No. 4, and even No. 10 mesh, with from 15% to 20% passing through as fine a mesh as 200 mesh (U.S. Standard).

Seal slurry treatments are used to rejuvenate (restore) worn-out pavements by filling fissures or cracks, pits and scaled areas. In applying these treatments, the worn-out area to be sealed is first cleaned with either hand or power brooms and is air-blown. The thus cleaned surface is usually dampened before applying the slurry; and, should the surface be very dry, as an asphalt "fog seal" of a diluted SS-type emulsion may be applied first immediately before the slurry is applied.

In actual paving practice when applying emulsion slurry seals, care should be taken not to use too much water, as this results in a longer settling of the seal coating. At the same time, a satisfactory "laydown" and an absence of stiffening while being applied by squeegeeing (so far the only satisfactory method in slurry seal work) are desired for an efficient operation. Also, even though the seals are thin, ranging in thickness from about $\frac{1}{16}''$ to no more than $\frac{1}{4}''$, and usually to $\frac{1}{8}''$, they must have a satisfactory resistance to wear and must be skid-proof.

Past experience has shown that the nature of the emulsifier employed in preparing asphalt emulsions, particularly cationic asphalt emulsions, for the formulation of emulsion slurry seals definitely influences performance of these latter.

I found that cationic, slow-setting, paving emulsions prepared by emulsifying from about 50 to about 75% by weight of bitumen, such as asphalt, in water with the aid of surface-active salts of the aforementioned reaction products of aliphatic polyamines and wood resin acids are eminently superior for formulating slurries with fine mineral aggregate for seal coating work. The resulting slurry seals mix well, pump well, lay down well, do not stiffen while being applied, and, once set (hardened), wear well under traffic.

Satisfactory emulsifiers in accordance with the present invention are cation-active salts of the materials obtained by reacting a wood resin acid, such as abietic acid, or a wood resin acid source material, such as a rosin or colophony, with an aliphatic polyamine, e.g., tetraethylene pentamine. The hydrohalide salts, and particularly the hydrochloride salts, of these reaction products, in amounts from about 0.2 to about 2.0% by weight of the final emulsion are effective in producing emulsions of from 50 to 75% of asphalt, the balance to 100% by weight being water. A particularly satisfactory emulsifier is the hydrochloride of the reaction product of a pinewood resin material, sold in the trade under the name of "Vinsol Resin," with tetraethylene pentamine. "Vinsol Resin" is substantially insoluble in aliphatic petroleum hydrocarbon solvents and has a softening point of about 120° C. The emulsifier is prepared by heating, for instance, 100 g. (0.17 equivalents) of "Vinsol Resin" in a steel vessel to 233° C., adding thereto with stirring 34 g. (0.18 mole) of tetraethylenepentamine heated to 93° C., and allowing the water of reaction to distill out. The final hydrochloride emulsifier is produced by grinding the reaction product of the resin and the amine, and dissolving it in water acidulated with hydrochloric acid. The emulsion can then be prepared by using the hydrochloride salt to emulsify asphalt in water in a conventional way, as in a colloid mill.

By contrast, a number of similar type salts of the reaction products of tall oil acids and aliphatic polyamines, and, in particular, of tetraethylenepentamine, have been found unsatisfactory for the preparation of emulsions of bitumen in water suitable for slurry seal work. Apparnetly, despite the presence of abietic acid in tall oil acid mixtures, a different mechanism of film stabilization takes place when employing tall oil acid-amine reaction products as emulsifiers for bitumen, precluding formation of a satisfactory product.

A number of asphalt emulsions were prepared in accordance with the invention using a hydrochloride of Vinsol Resin and tetraethylenepentamine (TEPA) as the primary emulsifier, and their properties were determined.

The following tests were carried out: Determination of emulsion pH; tests in conformity with the standard procedures described in the ASTM Method D–244 (Residue, Settlement, Cement Test, Sieve Test, Viscosity in SSF at 77° F.); also Pumping Stability. This latter determination consists in circulating the emulsion through a specially chosen gear pump until the pump binds, at which point the time in seconds from the beginning of circulation is noted.

The composition and properties of the several emulsions are shown in Table I.

In addition to the preferred "Vinsol Resin-tetraethylenepentamine" hydrochloride primary emulsifier of the invention, minor amounts of other materials conventionally used in bituminous emulsions have been employed as auxiliary emulsifiers and stabilizers in formulating the emulsions of Table I, namely: a non-ionic ethylene glycol polyether emulsifier which improves the pumping behavior of the emulsion mix (trademark "Igepal CO–997"); and a cationic alkyl-substituted imidazoline material which provides a better particle size distribution and also assists pumping (trademark "Nalcamine G–39M").

TABLE I

| Emulsion composition in percent by weight | A | B | C | D | E |
|---|---|---|---|---|---|
| Asphalt, 50-60 penetration | 61.00 | 61.00 | | | |
| Asphalt, 85-100 penetration, acid number about 3.5 | | | 61.00 | | |
| Asphalt, 60-70 penetration, acid number about 1.0 | | | | 61.00 | 61.00 |
| Vinsol Resin-TEPA | 1.00 | 1.00 | 0.50 | 0.75 | 0.50 |
| Nalcamine G-39M | | 0.050 | 0.025 | 0.038 | 0.025 |
| Igepal CO-997 | | | 0.50 | 0.543 | 0.357 |
| Hydrochloric Acid (20° Bé.) | 0.875 | 0.875 | 0.357 | 0.380 | 0.260 |
| Water | 37.125 | 36.575 | 0.260 | 37.289 | 37.858 |
| | | | 37.858 | | |
| Properties of emulsions: | | | | | |
| pH | | | | 3.3 | 3.3 |
| Residue, percent by weight | 61.6 | 60.6 | | 61.6 | 61.4 |
| Sieve test: | | | | | |
| 20 mesh, percent retained | 0.02 | 0.05 | | 0.02 | 0.035 |
| 40 mesh, percent retained | Trace | Trace | | 0.005 | Trace |
| 80 mesh, percent retained | 0.06 | 0.005 | | 0.005 | 0.02 |
| 7-day settlement, percent | 0.2 | −0.2 | | −0.2 | |
| Cement test | Pass | Pass | | Pass | Excellent |
| Pumping test, seconds | 10 | 180+ | | 180+ | 39 |
| Viscosity at 77° F. in SSF | | | | 20 | 19 |

It is plainly seen from the results of Residue by Distillation, Viscosity, Settlement and Cement Tests that the emulsions prepared with an emulsifying salt of the reaction product of an aliphatic polyamine with a wood resin acid in accordance with the invention favorably compare with previously known bituminous anionic and cationic emulsions used in slurry seals by the applicators and conform with the requirements of the industry as established in the ASTM Standard Specification D-977. Adequate pumping stability is readily assured by the addition of minute quantities of conventional stabilizers, such as "Igepal CO-997" and/or "Nalcamine G-39M."

Slurry seal mixes were next prepared, using different asphalt emulsions in combination with an aggregate made up of sand and crusher dust (50:50) and water of dilution (mixing). The mixes were tested in accordance with a specially designed "Wet Track Abrasion Test" to measure the wearing quality of the fine aggregate-bituminous surfacings laid with these slurry seal mixes under wet abrasive conditions.

In this Abrasion Test, samples of air-dried aggregate (600 g.), passing entirely through No. 8 sieve are weighed into a mixing bowl, stirring in weighed amounts (15%, 20% and 25% by weight of the aggregate) and sufficient water in increments to form a creamy slurry. The lowest water content at which the mixture is capable of flowing through a 6" metal funnel with a ¾" at the top to ½" opening at the bottom, without segregation, is selected as "Slurry Pouring Consistency."

Test samples are then prepared by applying (spreading) each asphalt emulsion slurry mix on a circular pad of 60 lb. roofing felt, ⅛" thick and 11¼" in diameter. The coated pads are dried to constant weight at 140° F., cooled and weighed again, and placed in a water bath at 77° F. for 1 hour. Next, the pads are submerged in water in the specially designed receptacle (pan) of the "Wet Track Abrasion Tester" and abraded there for 5 minutes. The compressive action in this tester is produced by a rotating short section of a heavy (5") rubber, mounted on a horizontal arm of a motor-driven shaft and pressed against the test pad. The loss of material in grams per square foot is the "wear value." Comparisons of the results of this abrasion test with actual field performance on the road have shown that for satisfactory pavement surfaces this value should be less than 75.

The results of a series of such abrasion tests are shown in Table II.

In addition to the determination of wear values, laydown and stiffening behavior of the mixes were observed visually while squeegeeing them onto pads in preparing specimens for the Wet Track Abrasion Test.

TABLE II

| Composition of the mix | I | II | III | IV | V |
|---|---|---|---|---|---|
| Aggregate in percent by weight | 75 | 66 | 71 | 77.5 | 78.5 |
| Conventional Anionic SS-2 type: Emulsion of 58% Asphalt of 85-100 penetration | 15 | | | | |
| Conventional Anionic SS-1 Type: Emulsion of 58% Asphalt of 60-70 peretration | | | | 15 | |
| Cationic SS-type emulsion of asphalt of 85-100 penetration, formulated with a lignin amine salt emulsifier | | 15 | | | |
| Emulsion C of Table I | | | 15 | | |
| Emulsion D of Table I | | | | | 15 |
| Water of dilution | 10 | 19 | 14 | 7.5 | 6.5 |
| Test results: | | | | | |
| Stiffening | None | Heavy | None | | |
| Laydown | Smooth | Dragged | Smooth | | |
| Wear value, g./ft.² | 184 | 145 | 104 | 121 | 12 |

The significant reduction in wear of surfaces coated with the mixes prepared with the emulsions of the invention compared with the surfaces laid from conventional mixes is surprising. The different nature (origin) of the asphalts and the different concentrations (0.5 vs. 0.75) of the emulsifier are thought to be responsible for the wide divergence in wear values of seal surfacings from mixes III and V. In both cases, however, the wear is substantially less than in the case of conventional slurry seals, whether anionic or cationic; and a substantial improvement in performance, namely, easier application and a faster setting, is obtained because less water is required for diluting the emulsion of the slurry seal mix.

Thus, the use of the particular emulsifier salts for preparing slow-setting asphalt emulsions of the present invention for use in slurry seal work provides an unexpectedly improved performance as compared with the results heretofore obtained with both anionic and cationic emulsions of the prior art, facilitating the actual application work and securing a seal surface of superior wearing quality.

At this point, it is to be mentioned that other conventional additives, such as emulsifiers, stabilizers, etc., compatible with the slurry seal compositions of the present invention, may be present in an emulsion used therefor and prepared with an emulsifying salt of a reaction product of wood resin acids and aliphatic polyamines, as the primary emulsifier.

In conclusion, it is to be understood that the foregoing description and test data are offered solely to illustrate the invention and do not limit it except as defined in the following claims.

I claim:
1. An oil-in-water type emulsion comprising as its essential components from about 50 to about 75% by weight of a bitumen, from about 0.2 to about 2.0% by weight of an emulsifier which is a cation-active salt of the reaction product of tetraethylenepentamine and a wood resin acid, and water to make up 100% by weight, the properties of said emulsion conforming with the ASTM Specification D-977 for slow-setting emulsions.

2. An emulsion as defined in claim 1, wherein said emulsifier is a hydrochloride salt.

3. An emulsion as defined in claim 1, wherein said emulsifier is a cation-active salt of the reaction product of a substantially petroleum-hydrocarbon insoluble pinewood resin acid and tetraethylenepentamine.

4. An aqueous slurry of a bituminous emulsion and mineral aggregate suitable for slurry seal paving work and consisting essentially of (A) from about 15 to about 25% by weight of a slow-setting, oil-in-water type emulsion of about 50 to about 75% by weight of a bitumen, about 0.2 to about 2.0% by weight of a cation-active emulsifier which is a salt of the reaction product of tetraethylenepentamine and a wood resin acid, and water to make up 100% by weight of said emulsion; (B) from about 10 to 15% by weight of water added to form a slurry of the aggregate and the emulsion; and (C) mineral aggregate passing entirely through No. 4 and at least 80% retained on 200 mesh screen (U.S. Standard Series).

References Cited

UNITED STATES PATENTS

| 2,256,886 | 9/1941 | Buckley | 252—311.5 |
| 3,096,292 | 7/1963 | Mertens | 252—311.5 |
| 3,276,888 | 10/1966 | Rhodes | 106—277 |

FOREIGN PATENTS 914,775  1/1963  Great Britain.

LEON D. ROSDOL, *Primary Examiner.*
R. D. LOVERING, *Assistant Examiner.*

U.S. Cl. X.R.

252—311.5; 106—281, 283